UNITED STATES PATENT OFFICE.

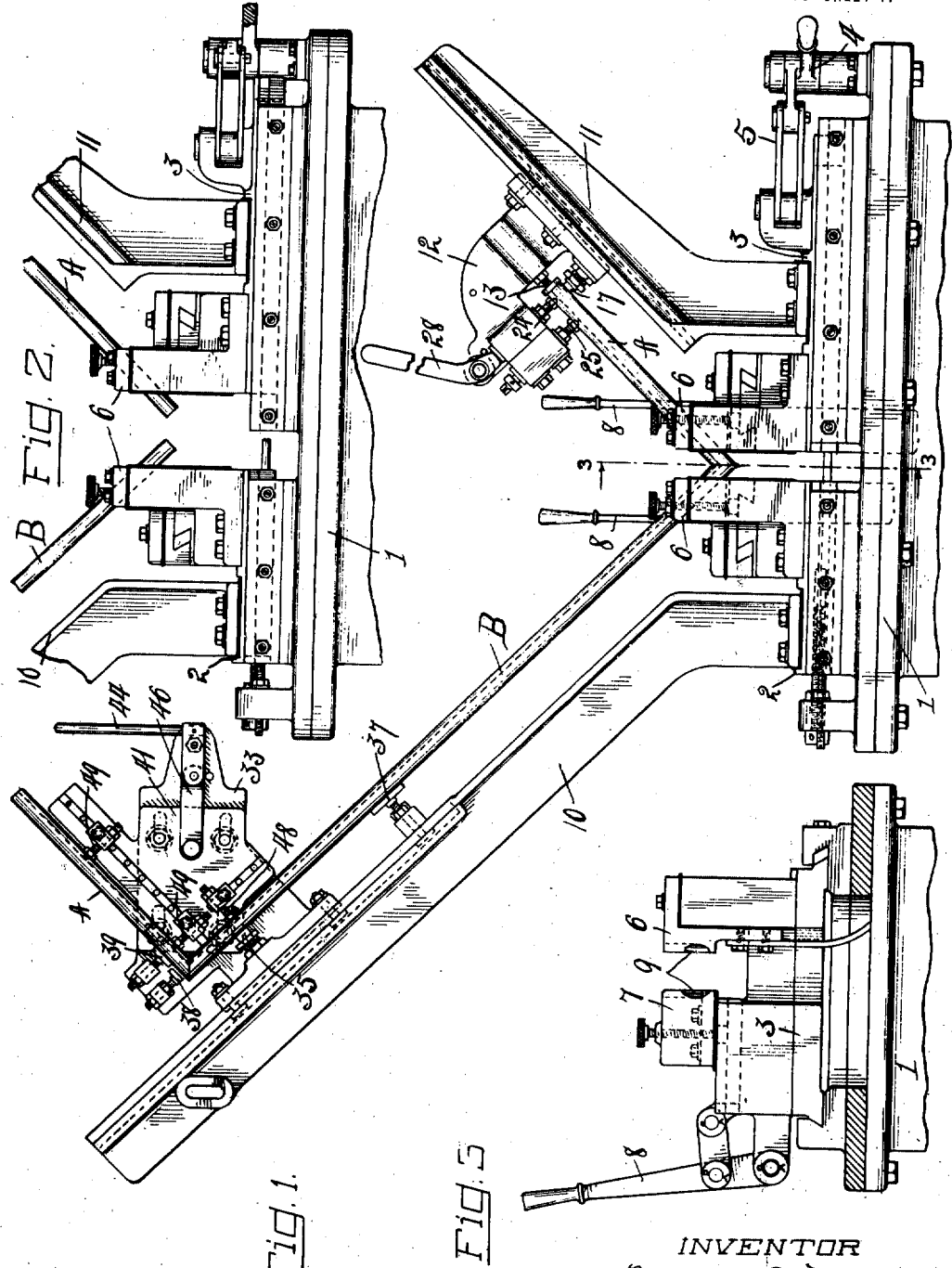

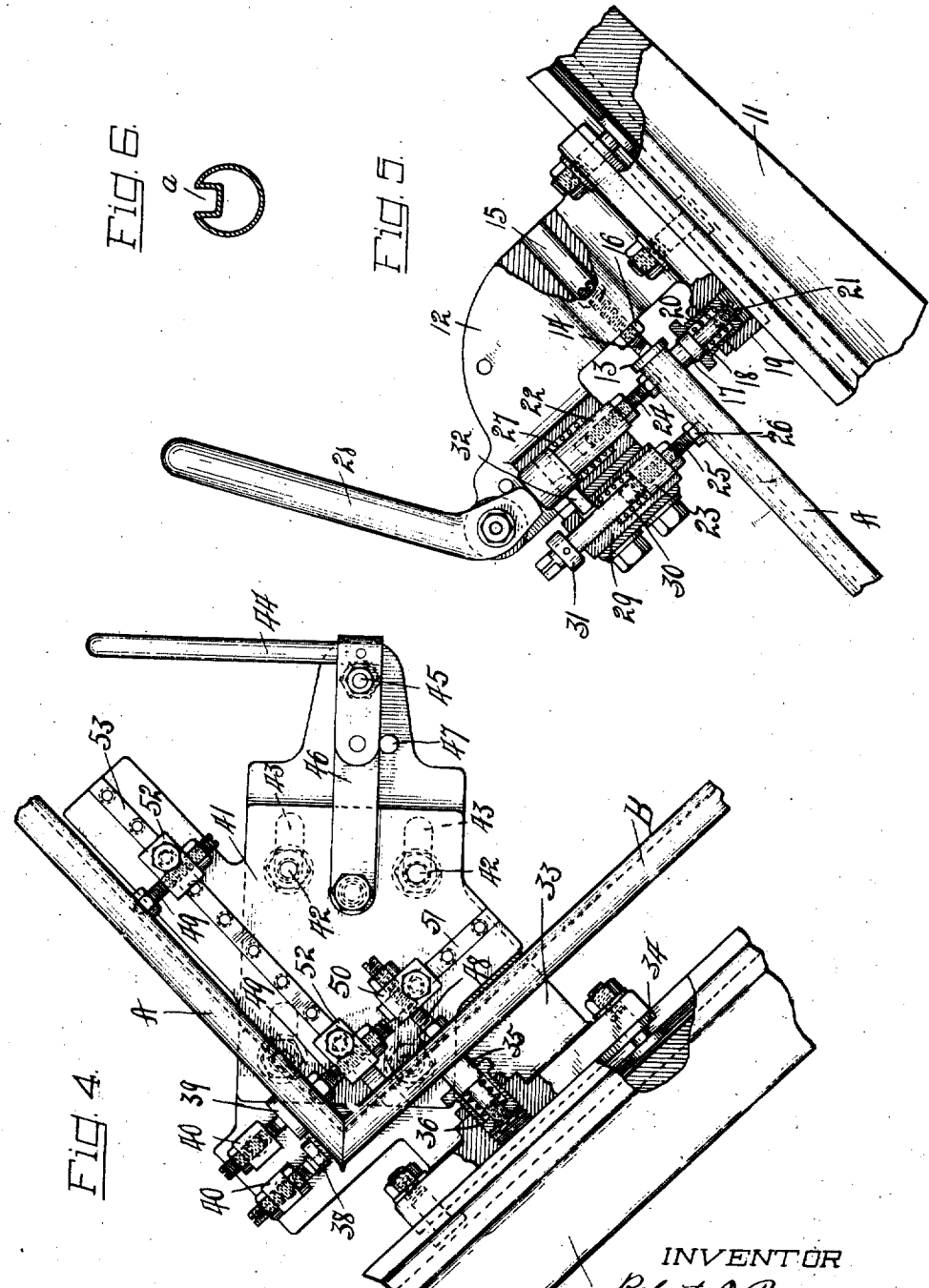

ROBERT C. PIERCE, OF CINCINNATI, OHIO, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

ELECTRIC WELDING-MACHINE.

1,235,524.  Specification of Letters Patent.  Patented July 31, 1917.

Application filed January 8, 1917. Serial No. 141,187.

*To all whom it may concern:*

Be it known that I, ROBERT C. PIERCE, a citizen of the United States, and a resident of Cincinnati, in the county of Hamilton and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric welding machines, and particularly to a machine of this character adapted for welding together sections of tubing to form automobile wind-shields.

The primary object of my invention is the provision of an electric welding machine adapted to insure the welding together, at a predetermined angle, of bar-like metal sections either of solid or hollow form, and to further insure the attainment of exact dimensions after the sections are completely welded. Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a front elevation of a welding machine embodying the invention, with the base portion of the frame broken away and with a wind-shield frame mounted therein in welding position. Fig. 2 is a similar view thereof with the two sets of work holding dies spaced from welding position and holding separate tube or bar sections. Fig. 3 is a section on the line 3—3 in Fig. 1. Fig. 4 is an enlarged elevation of the left-hand frame holding gage of the machine, with parts broken away. Fig. 5 is a similar view of the right-hand gage member for the work, and Fig. 6 is an enlarged cross-section of the form of tubing customarily employed in wind-shield frames.

Referring to the drawings; 1 designates the frame of an electric welding machine, on the top of which are mounted a normally stationary plate 2 and a movable slide plate 3. The plate 2 is customarily adjustable lengthwise of the frame, and the plate 3 has its movements lengthwise of the frame or toward and away from the plate 2 controlled by a lever 4, which has toggle connection 5 with the plate, as is well understood in the art.

Each plate 2 and 3 carries a set of work-clamping dies 6 and 7, which are relatively movable toward and away from each other transversely of the machine to clamp and release a work-piece. The die 7 in each set is the movable die, in the present instance, and has its movements controlled by a lever 8 with which it is connected, a separate control lever 8 being provided for each set of dies. One of the dies of each set, the die 6 in the present instance, is disposed in an electric welding circuit, as is well understood in the art. The clamping faces of the dies 6 and 7 of each set are grooved or fashioned as at 9, to hold a work-piece at a predetermined angle with respect to the angle of holding of a work-piece by the other set of dies. In the present instance, the two sets of dies are adapted to hold work-pieces at a 90° angle to each other, as this is the angle which the side and end bars of a wind-shield frame usually bear to each other.

Nothing of novelty is claimed for the electric welding machine shown and described, as this is the general type of electric welding machine commonly employed for separately clamping two bars of work-pieces and then moving the same into contact to accomplish a welding together of the same. It is also to be understood that while I have shown and described a particular form of electric welding machine for use in connection with my invention, hereinafter to be described, it is not intended to restrict the use of such invention to any particular form of welding machine.

Fixedly rising from the die carrying plates 2 and 3 are the respective arms or standards 10 and 11, the upper faces of which, in the present instance, are disposed at a 90° angle, one with respect to the other, and also with respect to a horizontal plane. The right-hand arm 11 has a bearing-head 12 mounted thereon for longitudinal adjusting movements, and is provided with means for gaging the position of an end bar A of a wind-shield frame before clamping the same between the dies 6 and 7 of the respective set. This gaging means comprises a stop 13, which is intended to receive the outer end thrust of the end piece A, and is carried by a stem 14 threaded into the bracket 12 for adjustment lengthwise of the arm 11. The inner end of the stem 14 projects into the socket 15 in the bearing-head 12 to facilitate the adjustment of the stem by the use of a screw driver from the outer side of the head. The stem 14 is secured in adjusted position by a lock nut 16. The outer side of the wind-shield end A is intended to rest, adjacent to the stop 13, against a yielding stud 17, which is mounted, in the present instance, in a socketed plug 18 that is threaded into an arm 19 projecting from the inner end of the bearing-head 12. A coiled compression spring 20 is mounted in the socket of the plug 18 and bears outward against the outer headed end of the stud 17 to yieldingly force it outward relative to the plug. The stud 17 has its inner end in the form of a stem which projects through the inner end of the plug 18 and carries a screw 21, the head of which is of greater diameter than the end of the stem and serves as a flange for coacting with the end of the plug to limit the outward movements of the stud 17.

The head 12 has its outer end overhanging or disposed in opposed relation to the stud 17 and carrying a pair of yieldingly mounted plungers 22 and 23, which have gage studs 24 and 25 projecting from their outer ends to engage the inner side of the work-piece or frame end A. The outer ends of the studs 24 and 25 are intended to enter the groove a customarily provided in the inner sides of the bars forming wind-shield frames. The studs 24 and 25 preferably are in the form of stems which are threaded into the respective plungers 22 and 23 to permit a relative adjustment thereof, and the outer end of each stud is provided with a stop shoulder 26, which limits the extent of projection of the stud end into the work-piece groove. The shoulder 26, in the present instance, comprises a nut which is adjustably threaded on the stud. The stud 24 is preferably positioned to engage the work-piece in direct opposition to the stud 17, while the stud 25 is positioned to engage the work-piece at a point nearer its inner end. A coiled compression spring 27 acts on the plunger 22 to normally retain it elevated or retracted with respect to the work-piece, and the inward movements of the plunger are controlled by a lever 28, which is pivoted to the bracket 12 and has its inner end in engagement with the outer end of the plunger..

The plunger 23 is carried for yielding longitudinal movements by a sleeve 29, which is in turn mounted in the bracket 12 for axially reciprocatory movements in parallel relation to the plunger 22. A coiled compression spring 30 in the sleeve 29 yieldingly acts on the plunger 23 to force the stud carrying end thereof outward, and such outward movements are limited by a stop shoulder 31 on the plunger 23 coacting with the upper or outer end of the sleeve 29. A pin 32 projects transversely from the outer end portion of the plunger 27 into a registering opening in the adjacent side of the sleeve 29, thus causing said plunger and sleeve to have longitudinal movements in unison.

The left-hand gage means is carried by a bearing-head 33, which is mounted on the top side of the arm 10 for adjustment longitudinally thereof, being secured in adjusted position thereto, in the present instance, by clamping bolts 34. The work-piece B, which, in the present instance, forms a side of a wind-shield frame, is clamped at its inner end by the set of dies 6 and 7, which is adjacent to the base of the arm 10. The outer end of the section B rests on a yielding supporting stud 35, which is yieldingly mounted, in the same manner as the stud 17, in a plug 36 that is adjustably threaded in a laterally projecting part of the bracket base. The section B may also rest on a rigid support 37, which is mounted on the top face of the standard 10 for adjustment lengthwise thereof and also for adjustment transversely thereof in a vertical plane.

The bracket 33 at the outer end thereof carries a pair of end abutting gages or stops 38 and 39 in vertically spaced relation, the gage 38 serving as a stop or end gage for the adjacent end of the section B before the end section A has been welded thereto, while the gage or stop 39 is intended to coact with the outer side of the adjacent end section A of the work when welded to the section B, and the latter section is clamped by the respective dies 6, 7 in position for the opposite end section A to be welded thereto. The stops 38 and 39 are adjustably carried by lugs 40, 40 projecting from the bracket 33, as shown. It will be understood that the welding of the end section A to the end section B effects a shortening of the section B, thereby requiring a different adjustment for the stops 38 and 39, as shown in Fig. 4.

The bearing-head 33 carries a sliding plate 41 mounted on the side thereof adjacent to the gages 35, 38 and 39 for movements, in the present instance, in a horizontal plane or in a plane which is substantially at a 45° angle to either bar or section A or B of the work, as is apparent by reference to Figs. 1 and 4. The movements of the plate 41 are guided by pins 42 projecting from the plate through registering slots 43 in the bearing-head, each of said pins also having a nut or head at its outer end for coacting with the outer side of the bearing-head 33 to retain the plate thereto in sliding engagement therewith. The movements of the plate 41 are controlled by a lever 44, which is pivoted at 45 to the inner end of the bearing-head and is connected to the plate 41 by a link 46 in the manner of a toggle. The toggle connection between the slide plate and lever is prevented from beaking in a downward direction by contact with a pin 47 projecting from the bearing-head. The plate 41, in the present instance, carries a shouldered lug 48 for holding coaction with the inner side of the section B of the work, and a pair of shouldered lugs 49 for holding coaction with the inner side of the end section A at the adjacent end of the work, each of said lugs having a portion thereof adapted to project into the groove $a$ on the respective work section. The lug 48 engages the work section B in opposition to the yielding base lug 35, and is carried by a block 50, which is slidingly adjustable in a plane parallel to the section B, on a bar 51 carried by the plate 41. The gage lugs 49 are carried by separate blocks 52, which are adjustable, in a plane parallel to the work section A, on a bar 53 that is carried by the plate 41. The inner or lower gaged lug 49 is preferably so adjusted as to engage the section A in substantially direct opposition to the stop 39. A reciprocation of the plate 41 causes the gage lugs 48 and 49 to simultaneously move into and out of holding engagement with the registering portions of the work sections or parts A and B, as is apparent by reason of the angle of movement of the plate with respect to said sections.

In the operation of my invention in connection with the welding of wind-shields, for which it is particularly adapted but not necessarily restricted, an end section A is placed between the right-hand set of dies 6, 7 with its outer end in end abutment with the stop gage 13 on the bearing-head 12, and the section is then clamped in such position by first throwing the lever 28 to the left to cause the gage lugs 24 and 25 to enter the registering groove $a$ of the section and to clamp the section to the yielding base lug 17, after which the lever 8 controlling the right-hand set of dies 6 and 7 moves forward to effect a clamping of the work section by the dies. It will be understood that the section A is thus positioned when the slide plate 3, which carries the clamping parts, is at the limit of its outward movement. The center or side section B of the work is then placed over the base or supporting members 35 and 37 with its outer end in end abutment against the stop 38 and with its inner end portion disposed between the dies 6 and 7 of the left-hand set. This having been done, the lever 44 is thrown up to the position shown to move the plate 44 outward and cause the gage lug 48 to have holding engagement with the section B in opposition to the yielding base lug 35, with a portion of the lug 48 projecting into the groove of the section B to cause a registering of such groove with the groove of the clamped section A. When the section B has been centered and clamped by the lug 48 the lever 8 controlling the left-hand set of dies is moved to cause a clamping of the section by such dies. The inner alined ends of the work sections A and B are now drawn together by an inward movement of the slide 3 and the welding circuit is opened to cause a heating and welding together of the contact work ends, in a manner well understood in the art. When the welding together of the sections A and B has been completed the different work clamping means are moved to release the work, and the work then has its position reversed with the welded section A bearing against the stop 39 and with the section B resting on the supporting lugs 35 and 37 and its free end disposed between the left-hand set of dies 6, 7. The lever 44 is then moved to force the gage lugs 49, 49 into holding engagement with the inner grooved side of the welded section A and to force the gage lug 48 into holding engagement with the inner grooved side of the section B, after which the dies of the left-hand set are moved into clamping engagement with the free end portion of the section B. An end section A is then clamped to the gage bracket 12 and right-hand set of dies 6, 7, in the same manner as above described, after which the plate 3 is moved inward and the current applied to effect a welding together of the section ends.

It will be understood that wind-shield tubing is formed in quite a variety of shapes and that the invention is therefore not restricted to the welding of tubing of any particular shape, and also that the invention is not necessarily restricted to welding together of work sections disposed at right angles to each other, as such sections may be disposed at different angles to each other without departing from the spirit of the claims.

It is evident in the use of my invention that the length of the frame being welded is accurately determined, as is also the angle at which the different sections are welded together, and that the glass or panel receiving groove $a$ of the frame will always be upon the inside thereof when the frame has been completely welded.

I wish it understood that my invention is not limited to any specific construction, arrangement or form of the parts, except in so far as such limitations are specified in the claims.

Having thus described my invention, what I claim as new, and desire to secure by Letters Patent, is—

1. In an electric welding machine, the combination with two relatively movable sets of work-holding dies, a part of which form electrodes, of an arm in fixed relation to each die set, and a work gaging and clamping means carried by each arm.

2. In an electric welding machine, the combination with two relatively movable sets of work-holding dies, a part of which form electrodes, of an arm in fixed relation to each die set, and means adjustably carried by each arm and coöperating with the associated set of dies to hold a work-piece at a predetermined angle to the work-piece to which it is to be welded and to gage the length of the work-piece when welded.

3. In an electric welding machine, the combination with two relatively movable sets of work-holding dies, a part of which form electrodes, of an arm in fixed relation to each die set, one arm being angled with respect to the other, a bearing head carried by each arm, and work gaging and clamping means carried by each bearing head for coöperating with the respective die set to hold a work-piece in predetermined relation to a work-piece held by the other means and die set.

4. In an electric welding machine, the combination with two relatively movable sets of work holding dies, a part of which form electrodes, of an arm in fixed relation to each die set, one arm being angled with respect to the other, a bearing head carried by each arm, one head at least being adjustable on its arm, and work gaging and clamping means carried by each bearing head for coöperating with the respective die set to hold a work-piece in predetermined relation to a work-piece held by the other means and die set.

5. In an electric welding machine, the combination with two relatively movable sets of work holding dies, a part of which form electrodes, of an arm in fixed relation to each die set with one arm at an angle to the other, and work gaging and clamping means carried by each arm and comprising an end abutting gage and clamping means for a work-piece engaged by the respective die set.

6. In an electric welding machine, the combination with two relatively movable sets of work holding dies, a part of which form electrodes, of an arm in fixed relation to each die set and inclined with respect to the other arm, and work gaging and clamping means adjustably carried by each arm and having an end gage and yielding clamping means for a work-piece engaged by the respective die set, said clamping means having parts which enter a groove in the work-piece to place such groove in predetermined relation to the groove in the work-piece which is to be welded.

7. In an electric welding machine, the combination with a set of work clamping dies, of an arm disposed in fixed relation to said die set, a bearing head carried by said arm, an end gage and clamping means for a work-piece carried by said head for coöperating with the die set to retain a work-piece in predetermined position during a welding operation.

8. In an electric welding machine, the combination with a set of work holding dies, a part at least of which form electrodes, of an arm disposed in fixed relation to said die set, a bearing head adjustably carried by said arm for movements toward and away from the die set, and means carried by said arm for gaging the length of a work-piece when welded and for coöperating with the die set to clamp a work-piece in predetermined position.

9. In an electric welding machine, the combination with a set of work holding dies, one at least of which forms an electrode, of an arm disposed in fixed relation to the die set, a bearing head adjustably mounted on said arm for movements toward and away from the die set, a work-piece end gage carried by said head, and means carried by said head for coöperating with the die set to clamp the work-piece and having parts which enter a groove in the work-piece.

10. In an electric welding machine, the combination with a set of work holding dies, one at least of which forms an electrode, of an arm in fixed relation to the die set, a bearing head carried by said arm, a work-piece end gage carried by the head, and means comprising opposing members operable to clamp a work-piece, a part of said members being adapted to enter a groove in the work-piece to coöperate with the die set to hold the work-piece in predetermined position.

11. In an electric welding machine, a set of work holding dies, one at least of which forms an electrode, an arm disposed in fixed relation to said die sets, a bearing head carried by said arm, work supporting and end gage members carried by said bearing head, and means movably carried by said bearing head and operable to coöperate with said members to clamp a work-piece in predetermined relation to said die set.

12. In an electric welding machine, a set of work holding dies, one at least of which forms an electrode, an arm disposed in fixed relation to said die sets, an adjustable bearing head carried by said arm, work supporting and end gage members carried by said bearing head, and means movably carried by said bearing head and operable to coöperate with said members to clamp a work-piece in predetermined relation to said die set.

13. In an electric welding machine, a set of work holding dies, one at least of which forms an electrode, an arm disposed in fixed relation to said die sets, a bearing head carried by said arm, adjustable work supporting and end gage members carried by said bearing head, and means movably carried by said bearing head and operable to coöperate with said members to clamp a work-piece in predetermined relation to said die set.

14. In an electric welding machine, a set of work holding dies, one at least of which forms an electrode, an arm disposed in fixed relation to said die sets, a bearing head carried by said arm, work supporting and end gage members carried by said bearing head, and means movably carried by said bearing head and adjustably carrying parts for movements therewith into and out of clamping engagement with a work-piece in opposition to said members.

15. In an electric welding machine, a set of work clamping dies, one at least of which forms an electrode, an arm disposed in fixed relation to said die set, a bearing head carried by said arm, work supporting and end gage members carried by said arm, a slide movable on said head at an angle to the axes of said members, means for moving said slide, and lugs carried by said slide and movable thereby into clamping engagemen with angled portions of a work-piece in opposition to said members and having parts for entering a groove in the work-piece to clamp and hold the work-piece in predetermined relation to said die set.

16. In an electric welding machine, a set of work clamping dies, one at least of which forms an electrode, an arm disposed in fixed relation to said die set, a bearing head carried by said arm, work supporting and end gage members carried by said arm, a slide movable on said head at an angle to the axes of said members, means for moving said slide, and lugs adjustably carried by said slide and movable thereby into clamping engagement with angled portions of a work-piece in opposition to said members and having parts for entering a groove in the work-piece to clamp and hold the work-piece in predetermined relation to said die set.

In testimony whereof, I have hereunto signed my name to this specification.

ROBERT C. PIERCE.